Jan. 1, 1929.

R. REED 1,697,088

TRIMMING TOOL

Filed Sept. 10, 1927

Robert Reed, Inventor

By C.A.Snow&Co.

Attorneys

Patented Jan. 1, 1929.

1,697,088

UNITED STATES PATENT OFFICE.

ROBERT REED, OF DALLAS, TEXAS.

TRIMMING TOOL.

Application filed September 10, 1927. Serial No. 218,701.

This invention relates to a tool designed primarily for trimming trees, shrubbery and the like, one of the objects being to provide a saw so mounted that the same can be operated without requiring the use of a ladder.

A further object is to provide a tool having an extensible handle formed of sections one or more of which can be used, one of the handle sections being adapted for use in breaking off the partly cut branches or threading the cut produced in them by the saw.

Another object is to provide a tool of this character which will act to push the foliage out of the path of the saw during each forward thrust thereof, thereby expediting the trimming operation.

Another object is to provide a tool the several parts of which can be made of standard materials.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings the preferred form of the invention has been shown.

In said drawings,

Figure 1 is a side elevation of the trimming tool showing the extensible handle connected thereto.

Figure 2 is a similar view showing the single handle section attached to the saw.

Figure 3 is an enlarged view partly in elevation and partly in section showing the construction of the saw frame.

Figure 4 is a bottom plan view of the structure shown in Figure 3.

Figure 5 is a section on line 5—5, Figure 3.

Referring to the figures by characters of reference 1 designates a length of pipe one end portion being bent into a curve as shown at 2 to constitute a deflector. The other end of this pipe has an elbow 3 connecting it to a short pipe section 4 which, in turn, engages a T-fitting 5. A slot 6 is cut into the free end portion of the deflector 2 to receive one end of a saw blade 7, said end being held in position by a transverse pin 8 inserted through the pipe and the saw blade. The other end of the saw blade has a shank 9 extending therefrom provided with a threaded portion 10, this shank being angular in cross section and insertible into an angular opening 11 formed in the T-fitting 5 as shown particularly in Figure 5. A threaded portion 10 engages an adjusting nut 12 which is adapted to be rotated for the purpose of pulling blade 7 taut or for releasing the blade for detachment.

The handle portion of the tool can be made up of several pipe sections indicated at 13, 14, 15 and 16. One of these sections, 13, is adapted to be screwed into the T-fitting 5 while the other sections are adapted to be connected to each other and to the section 3 by ordinary pipe couplings 17. The end section 16 can be hooked or bent as shown at 18. All of the sections, except section 16, can be formed with grip portions 19 produced by roughening surfaces of the sections in any preferred manner, as by making indentations therein.

The number of handle sections employed depends upon the distance of work from the operator. Where the limb to be trimmed is some distance from the ground, two or more of the sections can be coupled together to suit the convenience of the user and the handle can then be employed for reciprocating the saw blade so that it can cut into the part to be cut off. During each forward thrust of the saw the deflecting portion 2 will come against the foliage and shift it out of the path of the saw frame so that the movement of the saw will not be interfered with to an objectionable extent. After the limb or the like has been partly cut through the tool can be inverted to place the hook 18 in engagement with the part to be removed. By then pulling on the hook said part can be broken off. When the work is close to the operator the single end section 16 can be connected directly to the fitting 5 as shown in Figure 2.

By making the structure out of sections of pipe, the cost of production is reduced to the minimum and the entire device is rendered very durable as well as light.

What is claimed is:

A tool for trimming foliage including a pipe having one end portion curved to constitute a deflector, the free end of the curved portion being slotted, a T-fitting, a connection between said T-fitting and the other end of the pipe, a saw blade detachably secured at one end in slot and adjustably and detachably connected at its other end to the T-fitting, said blade being spaced from the pipe except at the slotted end thereof, a handle, detachably connected pipe sections for joining the handle to the T-fitting, each of said sections having a screw-thread at one end and a coupling at its other end, there being a roughened portion on each section constituting a grip.

In testimony that I claim the foregoing as my own, I have hereto affixed my signature.

ROBT. REED.